United States Patent
Yoon et al.

(10) Patent No.: US 8,014,285 B2
(45) Date of Patent: Sep. 6, 2011

(54) DATA FORWARDING METHOD FOR RELIABLE SERVICE IN SENSOR NETWORKS

(75) Inventors: Joo-sang Yoon, Seoul (KR); Chul-hee Kang, Seoul (KR); Ji-hoon Lee, Cheongju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1076 days.

(21) Appl. No.: 11/294,446

(22) Filed: Dec. 6, 2005

(65) Prior Publication Data

US 2006/0153154 A1 Jul. 13, 2006

(30) Foreign Application Priority Data

Dec. 29, 2004 (KR) ........................ 10-2004-0114825

(51) Int. Cl.
*G06F 11/00* (2006.01)

(52) U.S. Cl. ........ 370/235; 370/226; 370/243; 370/396; 370/400; 709/239; 709/242; 709/243; 714/18; 714/748

(58) Field of Classification Search ................... 370/226, 370/243, 279, 293, 315, 396, 400, 492, 501, 370/235; 709/239–244; 714/18, 748–751, 714/708

See application file for complete search history.

(56) References Cited

U.S. PATENT DOCUMENTS

| 4,422,171 | A  | * | 12/1983 | Wortley et al. | ................ | 714/748 |
|---|---|---|---|---|---|---|
| 6,240,461 | B1 | * | 5/2001 | Cieslak et al. | ................ | 709/235 |
| 6,580,715 | B1 | * | 6/2003 | Bare | .............................. | 370/396 |
| 6,920,493 | B1 | * | 7/2005 | Schwab | ........................ | 709/223 |
| 6,980,537 | B1 | * | 12/2005 | Liu | ................ | 370/338 |
| 2002/0051425 | A1 | * | 5/2002 | Larsson | ........................ | 370/252 |
| 2004/0008693 | A1 | * | 1/2004 | Grove et al. | ............. | 370/395.52 |
| 2004/0028023 | A1 | * | 2/2004 | Mandhyan et al. | ........... | 370/351 |
| 2006/0104210 | A1 | * | 5/2006 | Nielsen | ......................... | 370/248 |

FOREIGN PATENT DOCUMENTS

KR 10-2004-0078549 A 9/2004
KR 10-2004-0094617 A 11/2004

OTHER PUBLICATIONS

Ye et al., A Two-Tier Data Dissemination Model for Large-Scale Wireless Sensor Networks, Sep. 2002, ACM.*

* cited by examiner

*Primary Examiner* — Aung S Moe
*Assistant Examiner* — Hoon J Chung
(74) *Attorney, Agent, or Firm* — Sughrue Mion, PLLC

(57) ABSTRACT

A method for relaying received data by a relay node in a sensor network that includes a sink node, a source node for collecting and transmitting data requested by the sink node, and the relay node for relaying the data transmitted from the source node to the sink node. The relay node determines whether the source node that transmits the data is a previously identified source node, stores the data in a buffer and forwards the data to a neighbor node when the source node transmitting the data is the previously identified source node according to the determination. The data is managed based on the relay node having the buffer, rather than the source node and the sink node as in the related art. Further, the data error can be promptly handled.

18 Claims, 9 Drawing Sheets

○ : SENSOR NODE (RELAY FUNCTION)
◯ : SENSOR NODE (DISSEMINATION NODE FUNCTION)
● : SOURCE NODE
◐ : SINK NODE

⟶ : TRANSMIT QUERY
⇢ : TRANSMIT DATA

○ : SENSOR NODE (RELAY FUNCTION)  ⟶ : TRANSMIT QUERY
◯ : SENSOR NODE (DISSEMINATION NODE FUNCTION)  ----▶ : TRANSMIT DATA
● : SOURCE NODE
▨ : SINK NODE

○ : SENSOR NODE (RELAY FUNCTION)  ⟶ : TRANSMIT QUERY

◯ : SENSOR NODE (DISSEMINATION NODE FUNCTION)  ┄┄▶ : TRANSMIT DATA

● : SOURCE NODE

◉ : SINK NODE

DATA FORWARDING METHOD FOR RELIABLE SERVICE IN SENSOR NETWORKS

CROSS-REFERENCE TO RELATED APPLICATIONS

This application claims the priority from Korean Patent Application No. 2004-114825 filed on Dec. 29, 2004 in the Korean Intellectual Property Office, the entire disclosure of which is incorporated herein by reference. This priority claim is being made concurrently with the filing of this application.

BACKGROUND OF THE INVENTION

1. Technical Field

The present invention relates generally to a sensor network including a plurality of sensor nodes. More particularly, the present invention relates to a method for improving reliability of data transmission when data collected at a sensor node is transmitted to a sink node.

2. Related Art

A related art mobile communication system transfers data between a mobile element and a base station. That is, the mobile element and the base station directly transmit and receive data between each other without passing through other nodes. Meanwhile, a related art sensor network takes advantage of other nodes when transmitting data from a certain node to a sink node. Hereinbelow, the structure of the related art sensor network is described in reference to FIG. 1. The sensor network is constructed with a plurality of sensor nodes including a sink node.

The sink node, which is located in a sensor field, requests the sensor nodes to collect its required data. The data requested by the sink node pertains to temperature or other conditions of the sensor field. The sensor nodes in the sensor field collect the data as requested by the sink node and provide the collected data to the sink node. In this case, the sensor nodes within a certain distance from the sink node transmit their collected data directly to the sink node, and the sensor nodes not within the certain distance from the sink node forward their collected data to another sensor node, which in turn forwards the received data to still another sensor node or the sink node.

Figure 1:
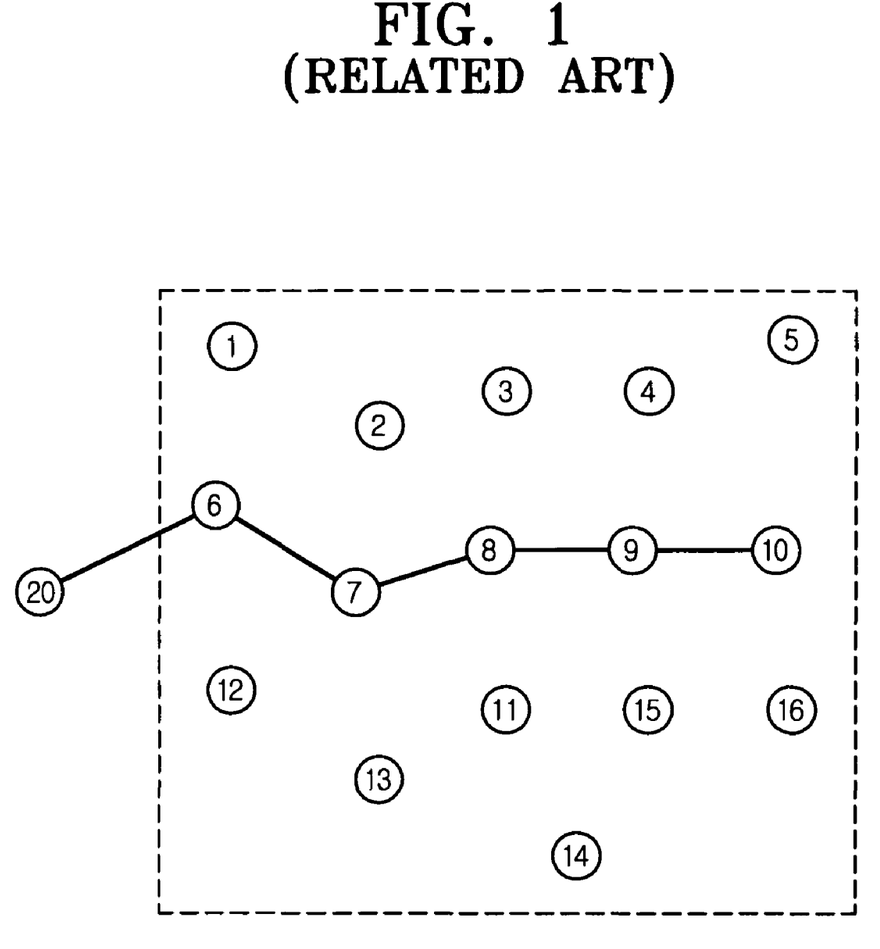
FIG. 1 illustrates a structure of a related art sensor network.

When the sensor node forwards its collected data to another sensor node rather than directly to the sink node, the reliability of the forwards data is reduced. Referring to FIG. 1, a node 10 forwards its collected data to a node 9, and the node 9 forwards the received data and its collected data to a node 8. In this manner, the collected data at the node 10 is delivered to a node 20 which is the sink node. The data delivery from the node 10 to the node 20 needs to pass through the node 6 through the node 9. When an error occurs at the data received from the node 6 through the node 9, a method is required to promptly handle the data error.

Figure 2:
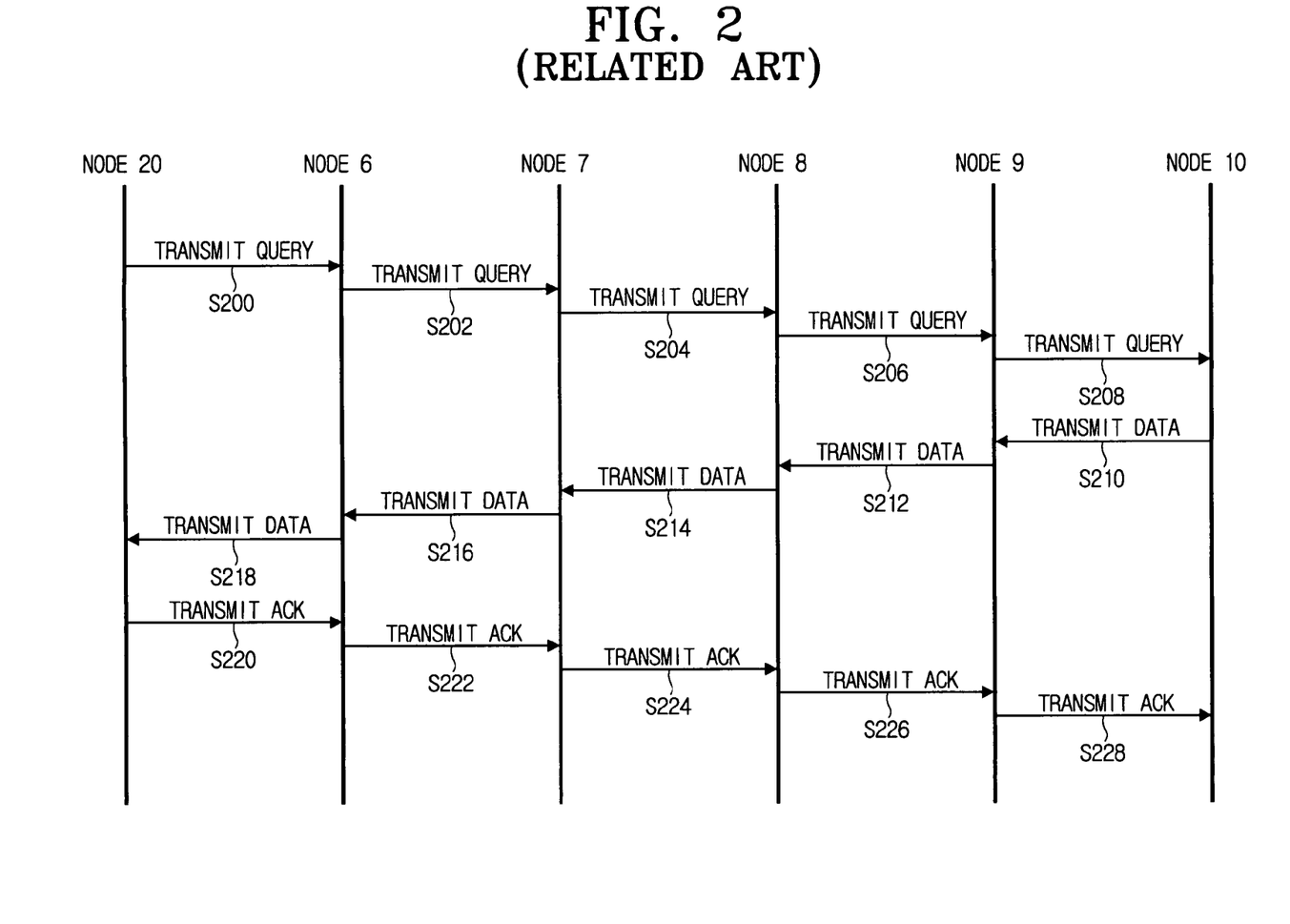
FIG. 2 illustrates message transmission and reception between a sink node and a source node in the related art sensor network.

FIG. 2 illustrates the delivery of the data collected at the node 10 to the node 20 which is the sink node of FIG. 1. The node 20 requests the node 10 to collect and transmit its required data (S200). Typically, the node 20 requests the transmission of the collected data by use of a query message. As the node 10 is not a one-hop node with respect to the node 20, the node 20 sends a query message to a one-hop node 6. The node 6 receiving the query message sends the query message to the node 7 (S202), and the node 7 sends the received query message to the node 8 (S204). The node 8 sends the received query message to the node 9 (S206), and the node 9 sends the received query message to the node 10 (S208).

The node 6 through the node 9 carry out a predefined update process with respect to the received query message, and the updated query message is forwarded to a neighbor node. Upon receiving the query message, the node 10 collects data as requested in the received query message.

The node 10 transmits the collected data to the node 9 (S210), and the node 9 forwards the received data to the node 8 (S212). The node 8 forwards the received data to the node 7 (S214), and the node 7 forwards the received data to the node 6 (S216). The node 6 forwards the received data to the node 20 (S218), and thus the node 20 receives the requested data.

The node 20 receiving the requested data sends an acknowledgement (ACK) message to the node 6 (S220), and the node 6 forwards the received ACK message to the node 7 (S222). The node 7 forwards the received ACK message to the node 9 (S224), and the node 6 forwards the received ACK message to the node 9 (S226). The node 9 forwards the received ACK message to the node 10 (S228), and the node 10 recognizes that the node 20 has received its transmitted data.

As such, a preset time is taken for the node 10 to recognize that the node 20 receives its transmitted data. Generally, a lowest limit of the preset time is the summation of the time required for the node 20 to receive the transmitted data from the node 10 and the time required for the node 10 to receive the ACK message from the node 20. Hence, the node 10 cannot promptly discover a transmission error of its transmitted data.

In addition, if a plurality of sink nodes request the same sensor node to transmit data, load of the sensor network is increased due to the multiple query messages transmitted from the plurality of the sink nodes to a single sensor node.

SUMMARY OF THE INVENTION

An aspect of the present invention provides a method for promptly determining error of data transmitted and received between a sink node and a source node over a sensor network. Another aspect of the present invention relates to method for handling error of data transmitted and received between a sink node and a source node over a sensor network. However, the exemplary embodiments are not limited thereto, nor are the foregoing aspects required to practice the exemplary embodiments.

In accordance with an aspect of the present invention, there is provided a method for relaying received data by a relay node in a sensor network that includes a sink node, a source node for collecting and transmitting data requested by the sink node, and the relay node for relaying the data transmitted from the source node to the sink node, the method including determining whether the source node that transmits the data is a predefined source node; and storing the data in a buffer and forwarding the data to a neighbor node when the source node transmitting the data is the predefined source node according to the determination.

In accordance with another aspect of the present invention, there is provided a relay node in a sensor network including a sink node, a source node for collecting and transmitting data requested by the sink node, and the relay node for relaying the data transmitted from the source node to the sink node, includes a controller for instructing to store and transmit the data when a source node, which is extracted from the received data, is a predefined source node; and a buffer for storing the received data according to a control instruction of the controller.

In accordance with yet another aspect of the present invention, there is provided a data forwarding system which includes a sink node; a source node for collecting and transmitting data requested by the sink node; and a relay node for storing data in a buffer and forwarding the data to a neighbor node when the source node transmitting the data is a predefined source node.

BRIEF DESCRIPTION OF THE DRAWING FIGURES

The above and/or other aspects of the invention will become apparent and more readily appreciated from the following description of exemplary embodiments, taken in conjunction with the accompanying drawing figures of which.

DETAILED DESCRIPTION OF THE EXEMPLARY EMBODIMENTS

Exemplary embodiments of the present invention will now be described in greater detail with reference to the accompanying drawings. In the following description, same drawing reference numerals are used for the same elements even in different drawings. The matters defined in the description, such as detailed construction and element descriptions, are provided to assist in a comprehensive understanding of the exemplary embodiments. Also, well-known functions or constructions are not described in detail for the sake of clarity and brevity.

Figure 3:
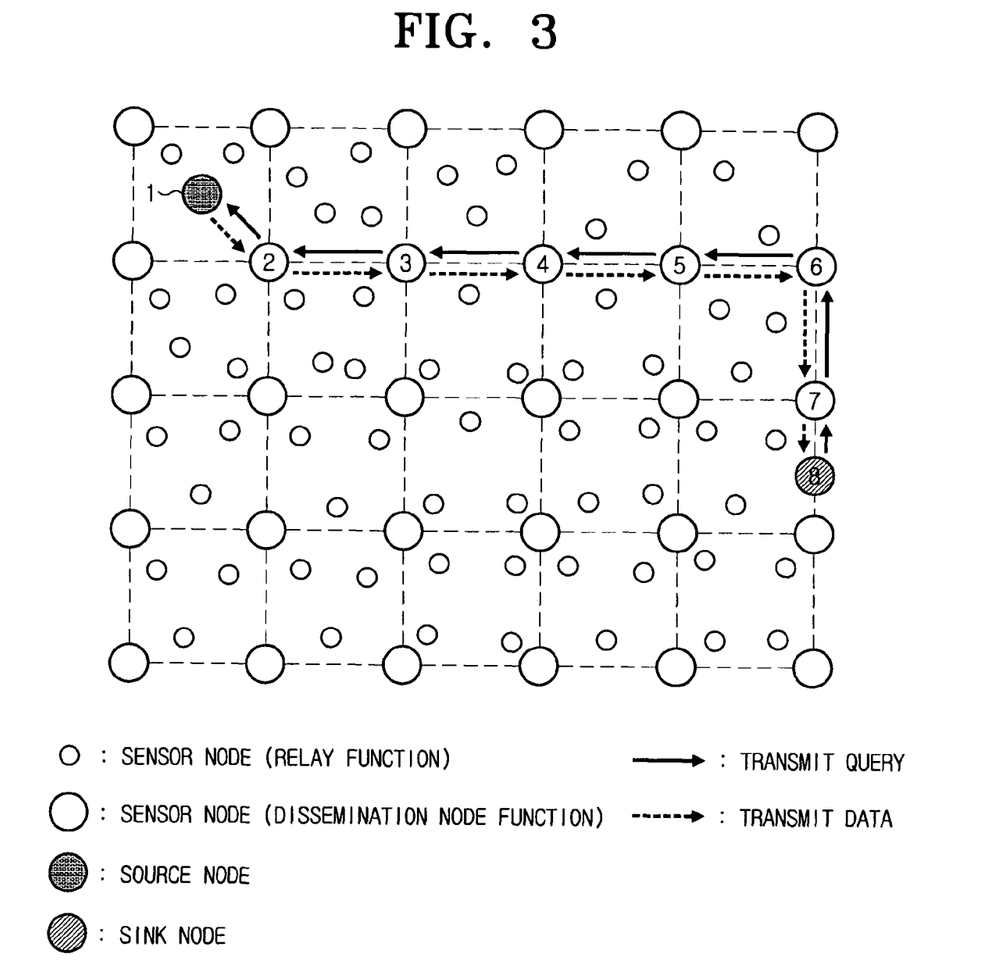
FIG. 3 illustrates data transmission from a source node to a sink node according to an exemplary embodiment of the present invention.

FIG. 3 illustrates data requested by a sink node is delivered from a source node to the sink node using a grid according to an exemplary embodiment of the present invention. A sensor field is divided into plurality of grid areas. Each grid area covers a plurality of sensor nodes. In other words, a grid area includes a plurality of sensor nodes performing a relay function, and one sensor node performing a dissemination function. Hereinafter, the sensor node with the relay function is referred to as a relay node, and the node with the dissemination function is referred to as a dissemination node. The sensor node functions as one of the relay node and the dissemination node, depending on the source node that transmits data. That is, the sensor node functions as the dissemination node with respect to data transmitted from a specified source node, and functions as the relay node with respect to data transmitted from a source node other than the specified source node. Detailed description on the function of the relay node and the dissemination node is well-known and is omitted for the sake of brevity.

Two types of the sensor nodes are illustrated in FIG. 3. A node presented as a small circle is a sensor node with the relay function, and a node presented as a large circle is a sensor node with the dissemination function. For example, if a node 1 functions as a source node, nodes presented as the large circle function as the dissemination node.

For example, a node 8 may be the sink node that requests collected data for a node 1 in reference to FIG. 3. The node 8 transmits a query message to a node 7, and the node 7 forwards the received query message to a node 6. The node 6 forwards the received query message to the node 5, and the node 5 forwards the received query message to the node 4. The node 4 forwards the received query message to a node 3, and the node 3 forwards the received query message to a node 2. The node 2 forwards the received query message to the node 1, and thus the node 1 collects the data requested by the node 8.

Although FIG. 3 illustrates that the node 7 transmits the query message directly to the node 6, the query message may be transmitted to the node 6 via a relay node if the node 6 is located more than one hop from the node 7. Other nodes with the virtual relay function operate in a substantially same manner. The virtual relay sensor node recognizes information relating to sensor nodes located within a range of a neighbor virtual relay sensor node, rather than information relating to every node within the sensor field. A dissemination node, which relays data delivered from the source node to the sink node according to the query message among dissemination nodes, acts as a virtual relay agent. That is, the node 2 through the node 7 act as virtual relay agents.

The node 1 requested to transmit data from the node 8, collects and transmits the requested data to the node 2. The node 2 forwards the data to the node 3, and the node 3 forwards the received data to the node 4. The node 4 forwards the received data to the node 5, and the node 5 forwards the received data to the node 6. The node 6 forwards the received data to the node 7, and the node 7 forwards the received data to the node 8 being the sink node. Hence, the node 8 obtains the requested data. Although it is illustrated in FIG. 3 that the node 6 forwards the data directly to the node 7, the data can be transmitted to the node 7 via the relay node when the node 7 is located more than one hop from the node 6. Other nodes with the virtual relay function operate in substantially the same manner.

Figure 4:
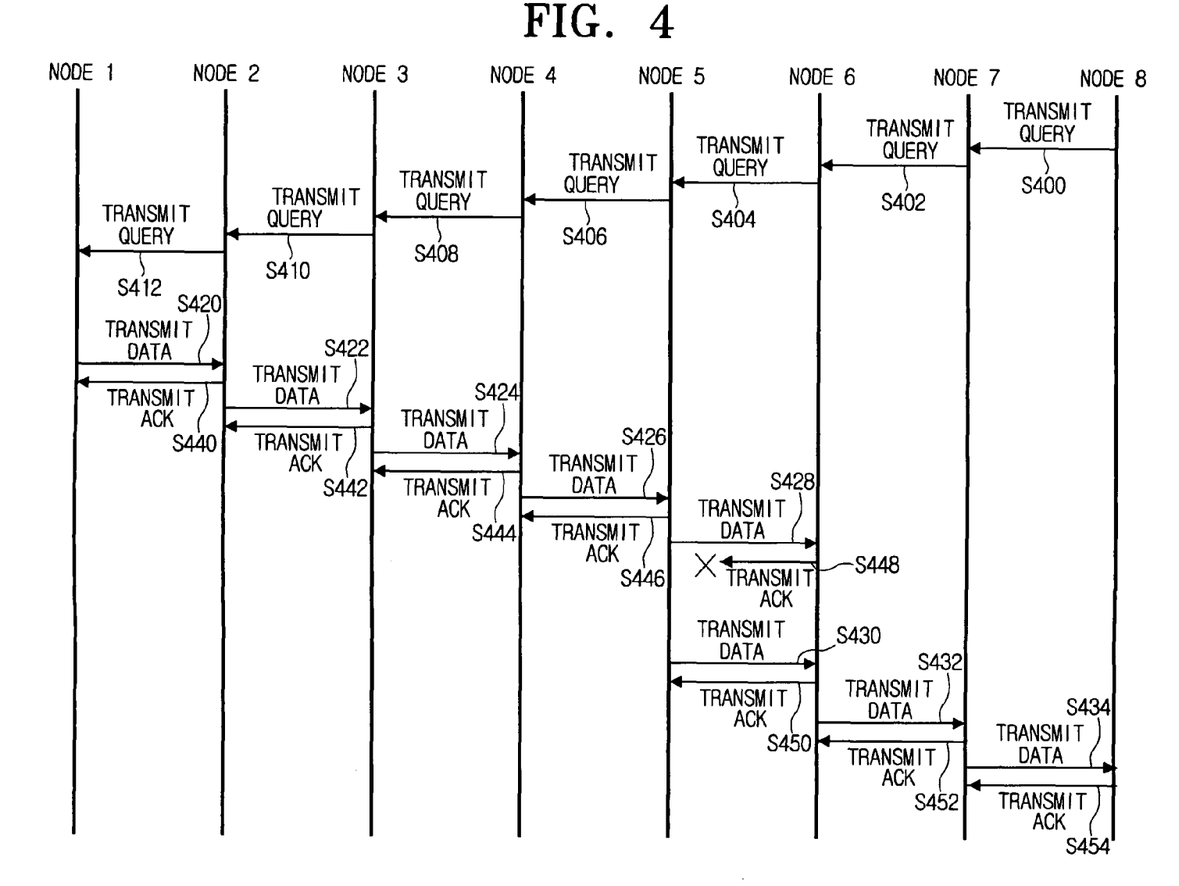
FIG. 4 is a flow diagram depicting message transmission and reception between the sink node and the source node of FIG. 3.

The following is an explanation of how to transmit and receive a query message, data, and an ACK message between a sink node and a source node in reference to FIG. 4, which illustrates the message transmission and reception between the node 8 being the sink node and the node 1 being the source node of FIG. 3.

The node 8 transmits a query message to the node 7 (S400), and the node 7 forwards the query message to the node 6 (S402). The node 6 forwards the query message to the node 5 (S404), and the node 5 forwards the query message to the node 4 (S406). The node 4 forwards the query message to the node 3 (S408), and the node 3 forwards the query message to the node 2 (S410). The node 2 forwards the query message to the node 1 (S412). The node 1 collects data as requested in the query message, stores the collected data in its buffer, and transmits the collected data to the node 2 (S420).

Upon receiving the data collected from the node 1, the node 2 stores the received data in its buffer. Next, the node 2 transmits an ACK message to the node 1 (S440). Upon receiving the ACK message from the node 2, the node 1 recognizes that the successful data transmission to the node 2 and drops the data stored in the buffer. The node 2 forwards the data stored in the buffer to the node 3 (S422). The nodes 3 and 4 operate the same as the node 2.

The node 5 forwards the data to the node 6 (S428). Upon receiving the data from the node 5, the node 6 transmits an ACK message (S448). However, the ACK message from the node 6 fails in the transmission to the node 5. The node 5 retransmits the data to the node 6 (S430) when the ACK message is not received from the node 6 over a preset time. The node 5 retransmits the data in case of the transmission error for the data transmitted from the node 5 and the transmission error of the ACK message received from the node 6.

The node 6 receiving the data from the node 5 transmits an ACK message (S450). Upon the reception of the ACK message from the node 6, the node 5 drops the data stored in the buffer. As above, the data originated from the node 1 is delivered to the node 8, which is the sink node.

As shown in FIG. 3 and FIG. 4, the exemplary embodiment permits the prompt recognition of the data transmission error by managing the data transmission and reception based on the dissemination node with the virtual relay agent function, rather than managing based on only the source node and the sink node. Therefore, the occurred transmission error can be handled promptly.

Figure 5:
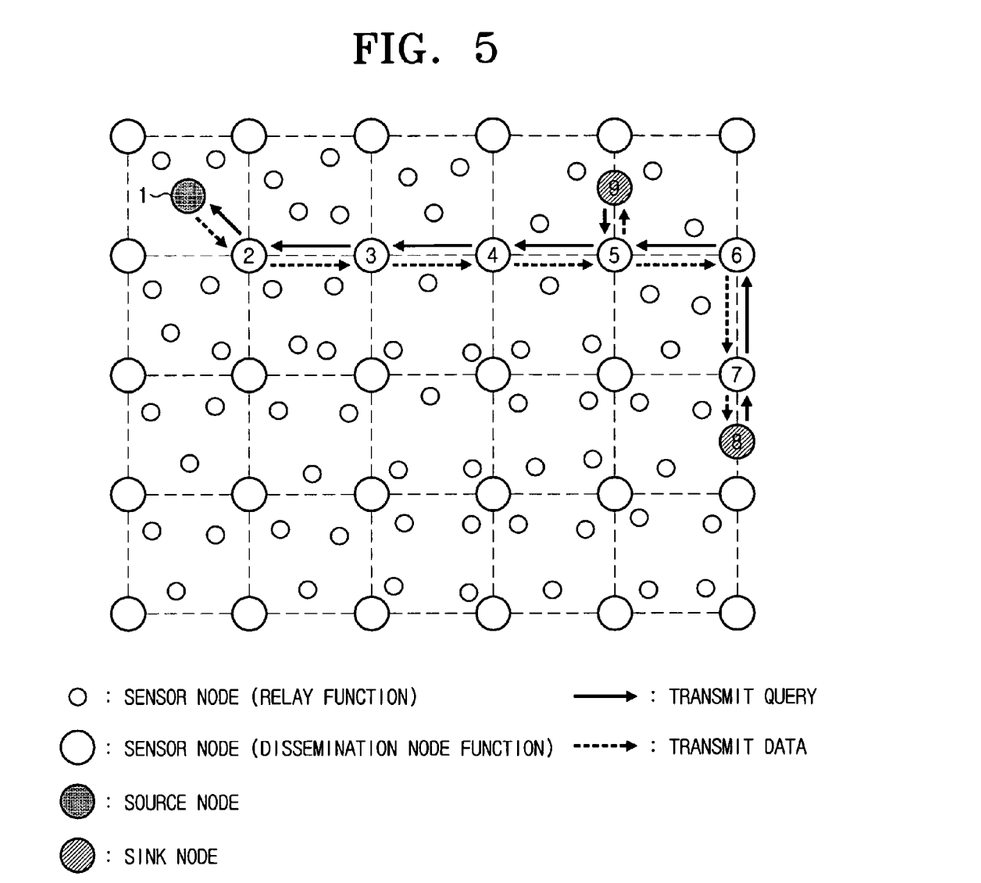
FIG. 5 illustrates data transmission from the source node to two sink nodes according to an exemplary embodiment of the present invention.

FIG. 5 illustrates transmission and reception of data requested by a sink node according to an exemplary embodiment, wherein two sink nodes request the same data to one node. The node 8 requests the transmission of the collected data to the node 1 as shown in FIG. 3, and the node 9 also requests the data transmission to the node 1. A query message originated from the node 8 is received on the node 5, and a query message originated from the node 9 is received on the node 5 as well.

The node 5 forwards to the node 4 only one query message, rather than the two query messages requesting the same data. Therefore, the number of transceived messages is reduced and the load on the node in the sensor network can be decreased.

The node 5 transmits the data received from the node 4 to the node 6 and the node 9. That is, the node 5 transmits the received data to at least two nodes that have transmitted the query message. The node 5 stores information pertaining to the at least two nodes transmitting the query message.

Figure 6:
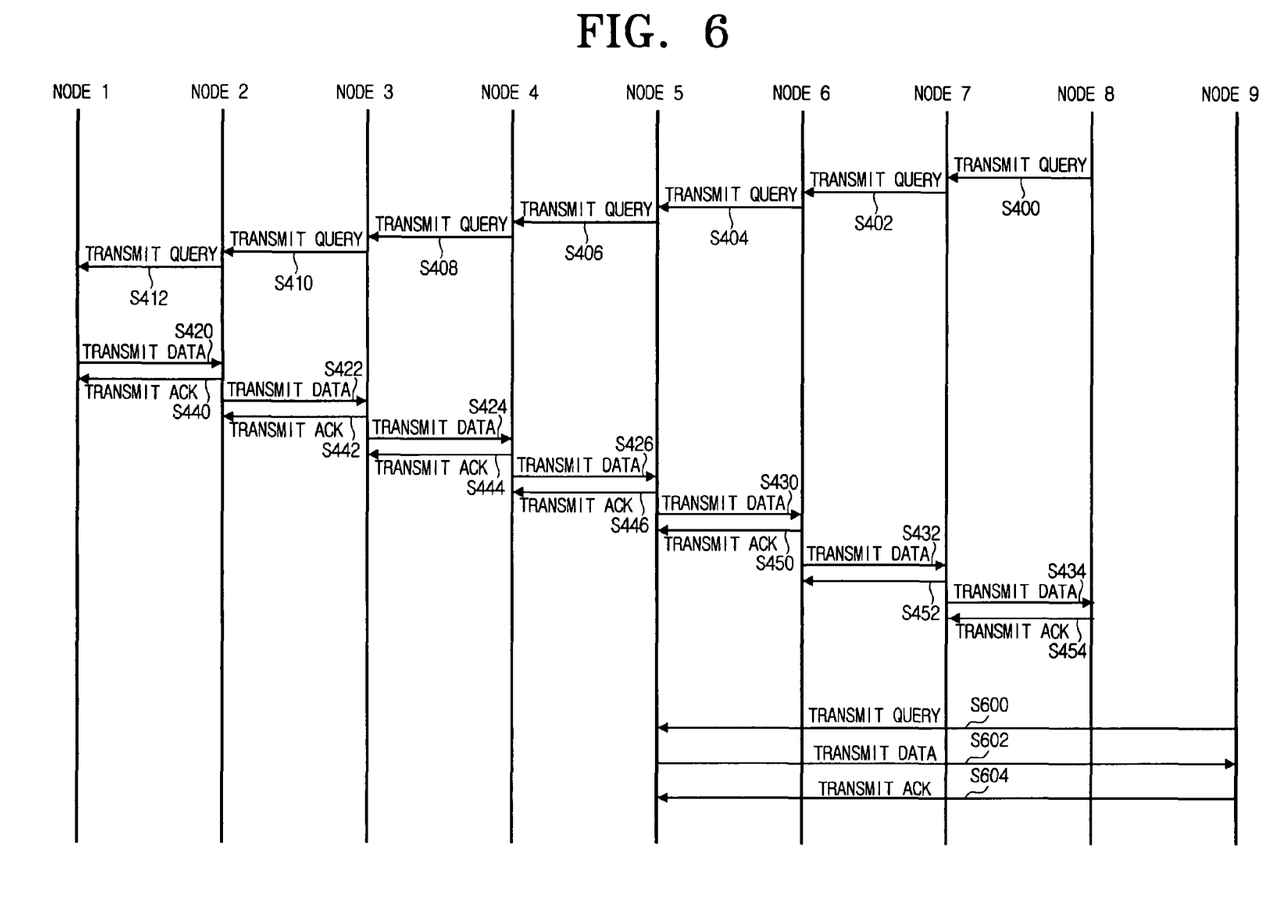
FIG. 6 is a flow diagram depicting message transmission and reception between the sink nodes and the source node of FIG. 5.

FIG. 6 illustrates message transmission and reception when two sink nodes request the data transmission as shown in FIG. 5. The transmission of the query message from the node 9 to the node 1 to request the data transmission, and the data transmission from the node 1 to the node 9 have been explained above in reference to FIG. 4 and thus will be omitted for brevity. Hereinbelow, descriptions are provided when the node 9 requests the node 1 to transmit its collected data.

The node 9 transmits a query message to the node 5 (S600). The node 5 analyzes information contained in the query message. The node 5 learns that the analyzed information matches information contained in a query message from the node 8. In particular, the node 5 learns the same information pertaining to the source node address and the data is to be collected at the source node. Thus, the node 5 aborts the transmission of the query message to the node 4.

Upon the reception of the collected data requested by the node 8 from the node 4, the node 5 transmits the received data to the node 6 and the node 9 (S602). The node 9 receiving the data from the node 5 sends an ACK message to the node 5 (S604). The node 5 drops the data stored in its buffer only when the ACK message is received from both the node 6 and the node 9.

Figure 7:
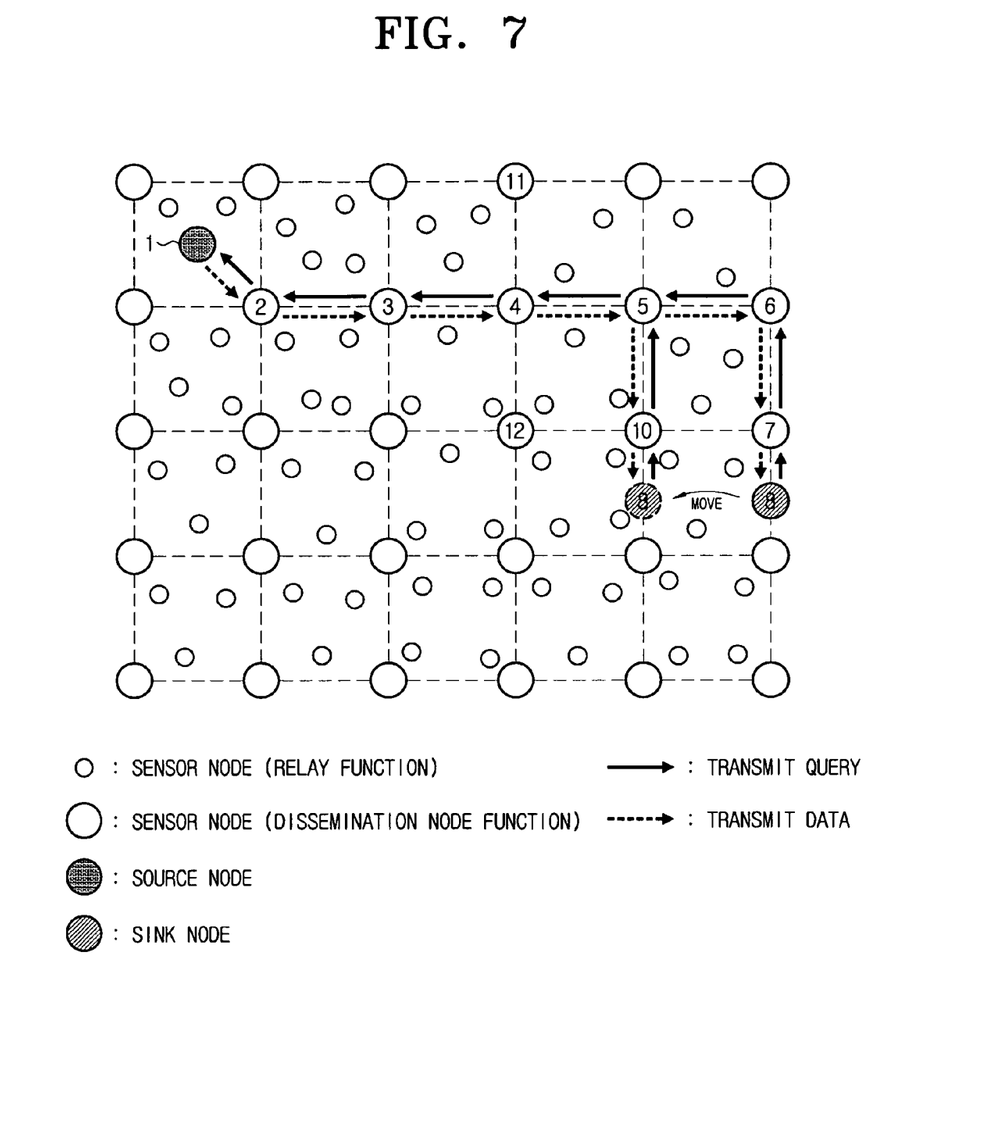
FIG. 7 illustrates data transmission from a source node to a sink node that changes its location according to an exemplary embodiment of the present invention.

FIG. 7 illustrates an operation of a sensor node in a sensor field when a sink node changes its location according to an exemplary embodiment. The node 8 being the sink node changes its location and sends a new query message to the node 10 at the new location. The node 10 forwards the received query message to the node 5. The node 5 determines whether information contained in the received query message from the moved node 8 matches information contained in the previous query message received from the node 8 before the node 8 changed its location. In particular, a determination is made whether the source node addresses, the types of the collected data, and the like contained in the query messages match. When the two query messages are the same according to the determination, the node 5 updates stored information relating to the sink node based on the received query messages.

The node 5 transmits the data received from the node 4, to the node 10 not the node 6. Since the node 5 recognizes the location change of the sink node, the data needs not to be forwarded to the node 6. As a result, the numbers of query messages, data, ACK messages transceived can be reduced.

Figure 8:
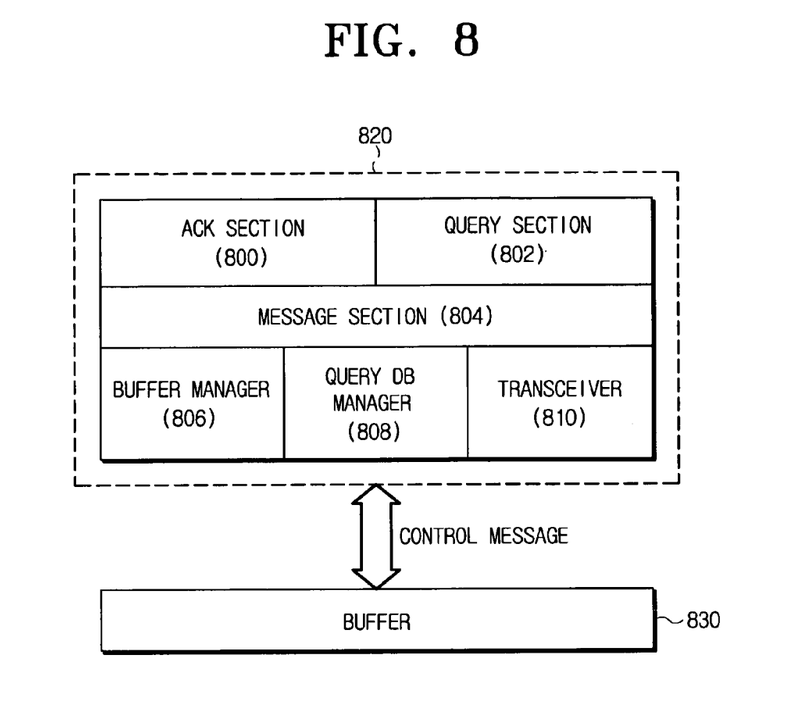
FIG. 8 illustrates a construction of a sensor node according to an exemplary embodiment of the present invention.

FIG. 8 depicts a construction of a sensor node in a sensor field according to an exemplary embodiment of the present invention. The sensor node includes a controller 820 and a buffer 830. The controller 820 includes an ACK section 800, a query section 802, a message section 804, a buffer manager 806, a query DB manager 808, and a transceiver 810. The following is an explanation of a function of a sensor node acting as the virtual relay agent in reference to FIG. 8.

The controller 820 extracts a source node that has transmitted received data. If the extracted source node is a previously identified source node, the controller 820 conducts the function as the virtual relay agent. Otherwise, the function as the relay node is carried out.

The ACK section 800 generates an ACK message in response to the received data. The query section 802 updates a received query message to forward the received query message to an immediate sensor node. The message section 804 generates a Keep Alive message and an Update message. The Keep Alive message informs neighbor nodes of its relevant operation being performed. Neighbor nodes receiving the Keep Alive message can learn that the node normally performs the relevant operation. The Update message is transmitted if a sensor node acting as the relay node intends to act as a dissemination node. The Update message contains an ID of the sensor node and information indicating that the sensor node functions as the virtual relay agent.

The buffer manager 806 instructs to drop or store data from or in the buffer. In addition, the buffer manager 806 calculates a buffer space of the buffer 830. The buffer manager 806, upon receiving data from a neighbor node, generated instructions to store the received data in the buffer 830. When an ACK message is received, the buffer manager 806 generates instructions to drop the stored information from the buffer 830.

The query DB manager 808 manages information that is extracted from the received query. Specifically, the query DB manager 808 stores information relating to a sink node and information relating to data requested by the sink node, in a table. In addition, the query DB manager 808 stores in the table information relating to a node to which the received data is to be forwarded.

The transceiver 810 transmits and receives the query message, the data, and the ACK message to and from neighbor nodes. Also, the transceiver 810 transmits and receives the Keep Alive message and the Update message to and from the neighbor nodes. The buffer 830 stores the data received from the transceiver 810 or drops the stored data according to a control instruction of the buffer manager 806.

When the sensor node functions as the relay node, the received data is not stored in the buffer 830. Thus, the buffer manager 806 need not perform the above-mentioned operation.

Figure 9:
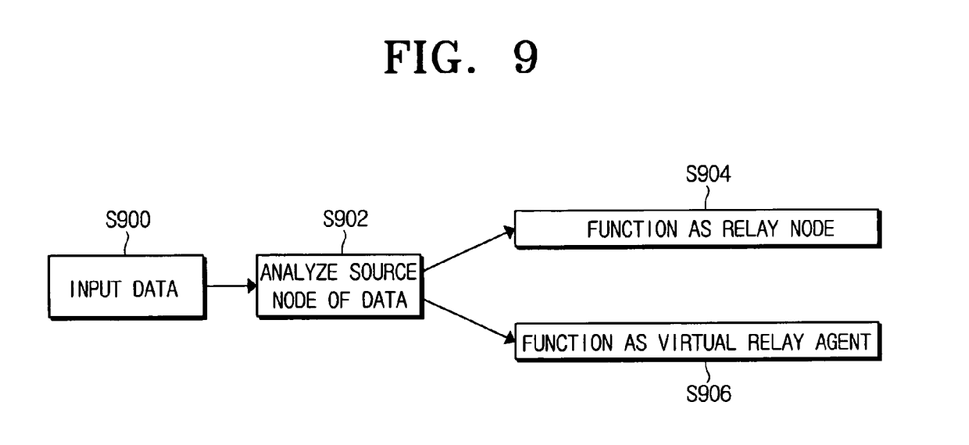
FIG. 9 illustrates that a relay node function or a virtual relay agent function is carried out depending on a source node of input data according to an exemplary embodiment of the present invention.

FIG. 9 illustrates a case when a sensor node functions as the relay sensor node and a case when the sensor node functions as the virtual relay sensor node. Upon receiving data (S900), the sensor node analyzes a source node of the received data (S902). When the analyzed source node is a pre-stored source node, the sensor node functions as the relay node (S904). When the analyzed source node is not a pre-stored source node, the source node functions as the virtual relay agent (S906). That is, the sensor node in the sensor field acts as the relay node or the virtual relay agent depending on the source node contained in the received data. As for the sensor node acting as the virtual relay agent, the received data is stored in its buffer. As for the sensor node acting as the relay node, the received data is temporarily stored in a queue.

Figure 10:
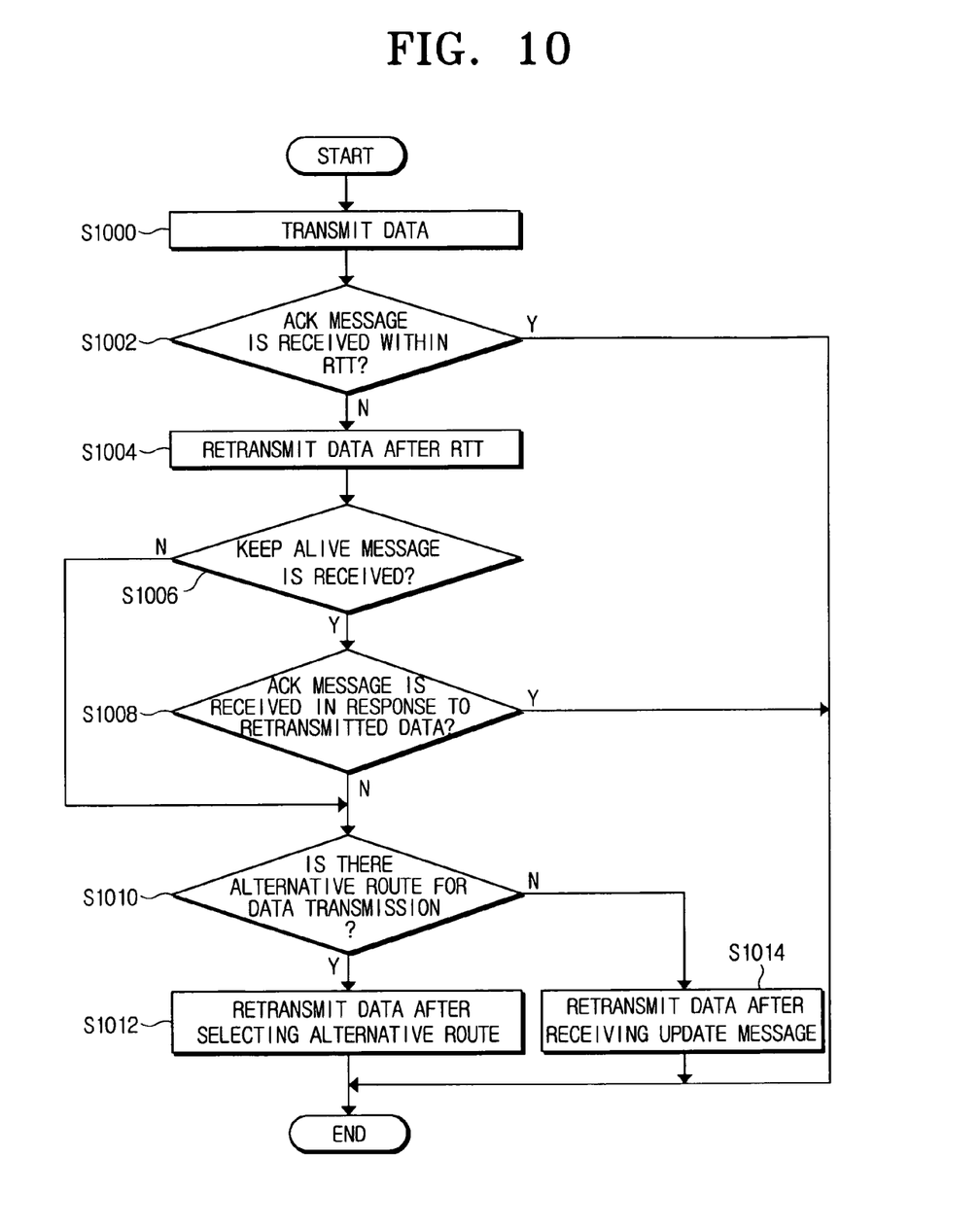
FIG. 10 is a flowchart explaining an operation of a dissemination node according to an exemplary embodiment of the present invention.

FIG. 10 is a flowchart explaining an operation of a node that functions as the virtual relay sensor node according to an exemplary embodiment of the present invention. The node transmits received data or its collected data (S1000). The node aggregates and forwards data as indicated in a query message received from the sink node.

The node determines whether an ACK message is received within a round trip time (RTT) (S1002). When the ACK message is received within the RTT, the operation is terminated. Otherwise, when the ACK message is not received within the RTT, the node proceeds to operation S1004. The calculation of the RTT is to be used is acquired from Equation 1.

$$RTT_n = \alpha RTT_{n-1} + (1 - \alpha)M \qquad \text{[Equation 1]}$$

In Equation 1, $RTT_n$ is a retransmission time to be used at present, and $RTT_{n-1}$ is a previous retransmission value. $\alpha$ is a significant coefficient ranging from 0 to 1. M denotes a RTT measured at present. The retransmission time to be used at present considers both the previous retransmission time and the present measured RTT. As for two previous retransmission values, their average is used.

The node retransmits the data after the RTT has passed (S1004). The node determines whether a Keep Alive message is received from a virtual relay sensor node that receives the data (S1006). The reception of the Keep Alive message from the virtual relay sensor node implies the virtual relay sensor node performs a relevant operation. When the Keep Alive message is received, the node proceeds to operation S1008, and when the Keep Alive message is not received, the node proceeds to operation S1010.

The node determines whether an ACK message is received in response to the retransmitted data (S1008). If not, the node proceeds to operation S1010, and if so, the node ends its operation.

The node determines whether there is an alternative route for the data transmission (S1010). Typically, the dissemination node holds information relating to neighbor dissemination nodes. For example, the node 4 holds information relating to the nodes 3, 5, 11, and 12. Accordingly, if error occurs at the data forwarded to the node 5, the node 4 can transmit the data along the alternative route via the node 12. As such, when the dissemination node, which has not functioned as the virtual relay agent, acts as the virtual relay agent, the dissemination node is an immediate dissemination node. For example, the node 12 becomes the immediate dissemination node.

The node transmits the data along the alternative route (S1012). The node retransmits the data after receiving an Update message (S1014). Referring back to FIG. 7, when error occurs at the node 10, the node 5 retransmits the data to a sensor node that transmits an Update message among the neighbor sensor nodes of the node 10, to deliver the data. As aforementioned, the Update message is transmitted when the node with the relay node function intends to act as the virtual relay agent if necessary. Therefore, the node 5 forwards the data to the node that serves as the virtual relay agent in the vicinity of the node 10 so that the sink node can receive the data.

In light of the foregoing as set forth above, the data transmitted and received over the sensor network is managed based on the dissemination node, rather than the source node and the sink node. Hence, error occurred can be promptly detected. To handle the error, the data is forwarded along the alternative route, to thus enhance the data transmission efficiency.

Additionally, the foregoing methods of data forwarding can be implemented in a computer-readable recording medium. More specifically, the computer-readable recording medium includes a set of instructions (e.g., a computer program). The instructions include the steps discussed with respect to the foregoing methods. As a result, the present invention can be implemented as software, in addition to the foregoing disclosure.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for relaying received data by a relay node in a sensor network that includes a sink node, a source node for collecting and transmitting data requested by the sink node, and the relay node for relaying the data transmitted from the source node to the sink node, the method comprising:
   determining whether the source node that transmits the data is a previously identified source node; and
   storing the data in a buffer and forwarding the data to a neighbor node when the source node transmitting the data is the previously identified source node,
   wherein the data stored in the buffer is retransmitted after an acknowledgement (ACK) message for the data has not been received within a time period,
   wherein if a Keep Alive message is not received from the neighbor node, a sensor node transmits an Update message, and the data is retransmitted to the sensor node, and
   wherein the Update message is transmitted by the sensor node if the sensor node intends to act as a dissemination node with the relay node.

2. The method according to claim 1, wherein the time period considers a previous time period.

3. The method according to claim 1, wherein the data is transmitted along an alternate route when an ACK message for the retransmitted data is not received, or when a Keep Alive message is not received from the neighbor node.

4. The method according to claim 1, wherein the node transmitting the Update message records information relating to the source node that transmits the data, and stores the received data in its buffer.

5. A relay node in a sensor network including a sink node, a source node for collecting and transmitting data requested by the sink node, and the relay node for relaying the data transmitted from the source node to the sink node, the relay node comprising:
a controller which generates an instruction to store and transmit the data when a source node, which is extracted from the received data, is a previously identified source node; and
a buffer which stores the received data according to the instruction,
wherein the data stored in the buffer is retransmitted after an acknowledgement (ACK) message for the data has not been received within a time period,
wherein if a Keep Alive message is not received from a neighbor node, a sensor node transmits an Update message, and the data is retransmitted to the sensor node, and
wherein the Update message is transmitted by the sensor node if the sensor node intends to act as a dissemination node with the relay node.

6. The relay node according to claim 5, wherein the controller comprises:
a buffer manager which generates an instruction to remove the data stored in the buffer, or stores the received data.

7. The relay node of claim 6, further comprising:
a transceiver which transmits data between the relay node and one of the source node and the sink node via a neighbor node;
an acknowledgement section which generates an ACK message when the relay node has received the data from the source node; and
a query section which generates a query when the relay node has received a query from the sink node.

8. The relay node of claim 7, further comprising:
a message section that generates one of a Keep Alive message indicative of a normal relevant operation being performed, and an Update message indicative of said relay node being a dissemination node; and
a query database manager that stores information relating to the sink node and data received from the source node.

9. The relay node according to claim 6, wherein the buffer manager generates the instruction to drop the data stored in the buffer when an acknowledgement (ACK) message for the transmitted data is received.

10. A data forwarding system comprising:
a sink node;
a source node for collecting and transmitting data requested by the sink node; and
a relay node for relaying the data transmitted from the source node to the sink node, wherein the relay node stores the data in a buffer and forwards the data to a neighbor node when the source node transmitting the data is a previously identified source node wherein the relay node retransmits the data stored in the buffer when an acknowledgement (ACK) message for the data is not received within a time period,
wherein if a Keep Alive message is not received from the neighbor node, a sensor node transmits an Update message, and the data is retransmitted to the sensor node, and
wherein the Update message is transmitted by the sensor node if the sensor node intends to act as a dissemination node with the relay node.

11. The data forwarding system according to claim 10, wherein the relay node forwards the data stored in the buffer to at least two nodes when data transmission is requested by the at least two nodes.

12. The data forwarding system according to claim 10, wherein the relay node determines a route for the data transmission when the sink node requesting the data transmission changes its location.

13. A non-transitory computer readable recording medium storing a program for relaying received data by a relay node in a sensor network that includes a sink node, a source node for collecting and transmitting data requested by the sink node, and the relay node for relaying the data transmitted from the source node to the sink node, the method comprising:
determining whether the source node that transmits the data is a previously identified source node; and
storing the data in a buffer and forwarding the data to a neighbor node when the source node transmitting the data is the previously identified source node,
wherein the data stored in the buffer is retransmitted after an acknowledgement (ACK) message for the data has not been received within a time period,
wherein if a Keep Alive message is not received from the neighbor node, a sensor node transmits an Update message, and the data is retransmitted to the sensor node, and
wherein the Update message is transmitted by the sensor node if the sensor node intends to act as a dissemination node with the relay node.

14. The non-transitory computer readable recording medium of claim 13, wherein the data stored in the buffer is retransmitted after an acknowledgement (ACK) message for the data has not been received within a time period.

15. The non-transitory computer readable recording medium of claim 14, wherein the time period considers a previous time period.

16. The non-transitory computer readable recording medium of claim 14, wherein the data is transmitted along an alternate route when an ACK message for the retransmitted data is not received, or when a Keep Alive message is not received from the neighbor node.

17. The non-transitory computer readable recording medium of claim 14, wherein the data is transmitted to a node that transmits an Update message when an ACK message for the retransmitted data is not received, or when a Keep Alive message is not received from the neighbor node, and further wherein the node transmitting the Update message records information relating to the source node that transmits the data, and stores the received data in its buffer.

18. A method for relaying data in a sensor network that includes a sink node, a source node for collecting and transmitting data requested by the sink node, and a plurality of relay nodes for relaying the data transmitted from the source node to the sink node, the method comprising:

receiving, at a relay node, the data transmitted from the source node and storing the received data in a buffer of the relay node;

transmitting, from the relay node, an acknowledgement message in response to the receiving the data, and subsequently transmitting the data from the relay node to a neighbor node if the source node is a previously identified source node;

if an acknowledgement message is received from the neighbor node in response to the transmitting the data, removing the data from the buffer; and if an acknowledgement message is not received from the neighbor node in response to the transmitting the data, retransmitting the data to the neighbor node, wherein the data stored in the buffer is retransmitted after an acknowledgement (ACK) message for the data has not been received within a time period, wherein if a Keep Alive message is not received from the neighbor node, the other neighbor node transmits an Update message, and the data is retransmitted to the other neighbor node, and wherein if the other neighbor node performing functions of a second relay node intends to act as a dissemination node performing functions of a virtual relay agent, the Update message is transmitted by the other neighbor node to the relay node.

* * * * *